United States Patent
Atanassov et al.

(10) Patent No.: US 8,208,044 B2
(45) Date of Patent: Jun. 26, 2012

(54) BAD PIXEL CLUSTER DETECTION

(75) Inventors: Kalin Atanassov, San Diego, CA (US);
Hsiang-Tsun Li, San Diego, CA (US);
Hau Hwang, San Diego, CA (US);
Babak Forutanpour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 12/233,413

(22) Filed: Sep. 18, 2008

(65) Prior Publication Data

US 2010/0066871 A1 Mar. 18, 2010

(51) Int. Cl.
*H04N 5/217* (2006.01)
(52) U.S. Cl. ......... 348/241; 348/243; 348/246; 348/247
(58) Field of Classification Search .................. 348/241, 348/243, 246, 247; 382/273, 274, 302
See application file for complete search history.

(56) References Cited

U.S. PATENT DOCUMENTS

| | | | |
|---|---|---|---|
| 6,965,395 B1 | 11/2005 | Neter | |
| 6,985,180 B2 | 1/2006 | Chang et al. | |
| 2003/0222995 A1* | 12/2003 | Kaplinsky et al. | 348/247 |
| 2004/0061785 A1 | 4/2004 | Aufrichtig et al. | |
| 2004/0096125 A1 | 5/2004 | Alderson et al. | |
| 2004/0239782 A1 | 12/2004 | Equitz et al. | |
| 2006/0044425 A1* | 3/2006 | Yeung et al. | 348/246 |
| 2006/0125939 A1* | 6/2006 | Yoneda | 348/246 |
| 2006/0215902 A1 | 9/2006 | Shibuya et al. | |
| 2006/0215920 A1 | 9/2006 | Yokose | |
| 2007/0058848 A1 | 3/2007 | Heike et al. | |
| 2010/0034481 A1* | 2/2010 | Forutanpour | 382/275 |

* cited by examiner

*Primary Examiner* — Yogesh Aggarwal
(74) *Attorney, Agent, or Firm* — Matthew J. Evans; James R. Gambale, Jr.

(57) ABSTRACT

Systems and methods of bad pixel cluster detection are disclosed. In a particular embodiment, a method includes determining a correlation value corresponding to a correlation coefficient between image data and at least one bad pixel cluster pattern, and detecting a bad pixel cluster corresponding to the at least one bad pixel cluster pattern based on the correlation value exceeding a threshold.

28 Claims, 8 Drawing Sheets

BAD PIXEL CLUSTER DETECTION

I. FIELD

The present disclosure is generally related to bad pixel cluster detection.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

Image data may include single pixels or clusters of pixels that have incorrect values that may result from one or more malfunctioning cells of an image array, from dust, from a scratch or other aberration on the camera lens, or other causes. Such bad pixels or defective pixels may be detected and corrected to improve a quality of the displayed image. However, accurate detection and correction of bad pixel clusters in a portable computing device may be limited by available processing resources.

III. SUMMARY

In a particular embodiment, a system is disclosed that includes a defect pixel cluster correction module coupled to receive image data from an image array and adapted to detect a cluster of bad pixels of the image data based on a correspondence between pixel values of the image data and a cluster pattern mask. The cluster pattern mask is associated with a center pixel and a nearest neighbor pixel to the center pixel.

In another particular embodiment, a system is disclosed that includes a signal processor adapted to detect bad pixel clusters in image data based on a normalized correlation between the image data and a bad pixel cluster pattern mask. The signal processor is further adapted to generate processed image data having corrected pixel values corresponding to detected bad pixel clusters. The system also includes a display controller coupled to receive the processed image data and to provide the processed image data to a display device.

In another particular embodiment, a method is disclosed. The method includes determining a correlation value corresponding to a correlation coefficient between image data and at least one bad pixel cluster pattern. The method also includes detecting a bad pixel cluster corresponding to the at least one bad pixel cluster pattern based on the correlation value exceeding a threshold.

In another particular embodiment, the method includes receiving image data including a test region, where pixels associated with a particular color in the test region have a first value, and where a pixel cluster of two pixels associated with the particular color in the test region have a second value that is approximately five percent larger than the first value. The method also includes performing a defective pixel correction process on the image data. The method further includes generating output data where the two pixels of the pixel cluster do not have the second value.

One particular advantage provided by embodiments of the bad pixel cluster detection is a high accuracy of detection of bad pixel clusters with a low occurrence of false positives, using correlation operations that can be performed at portable computing device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
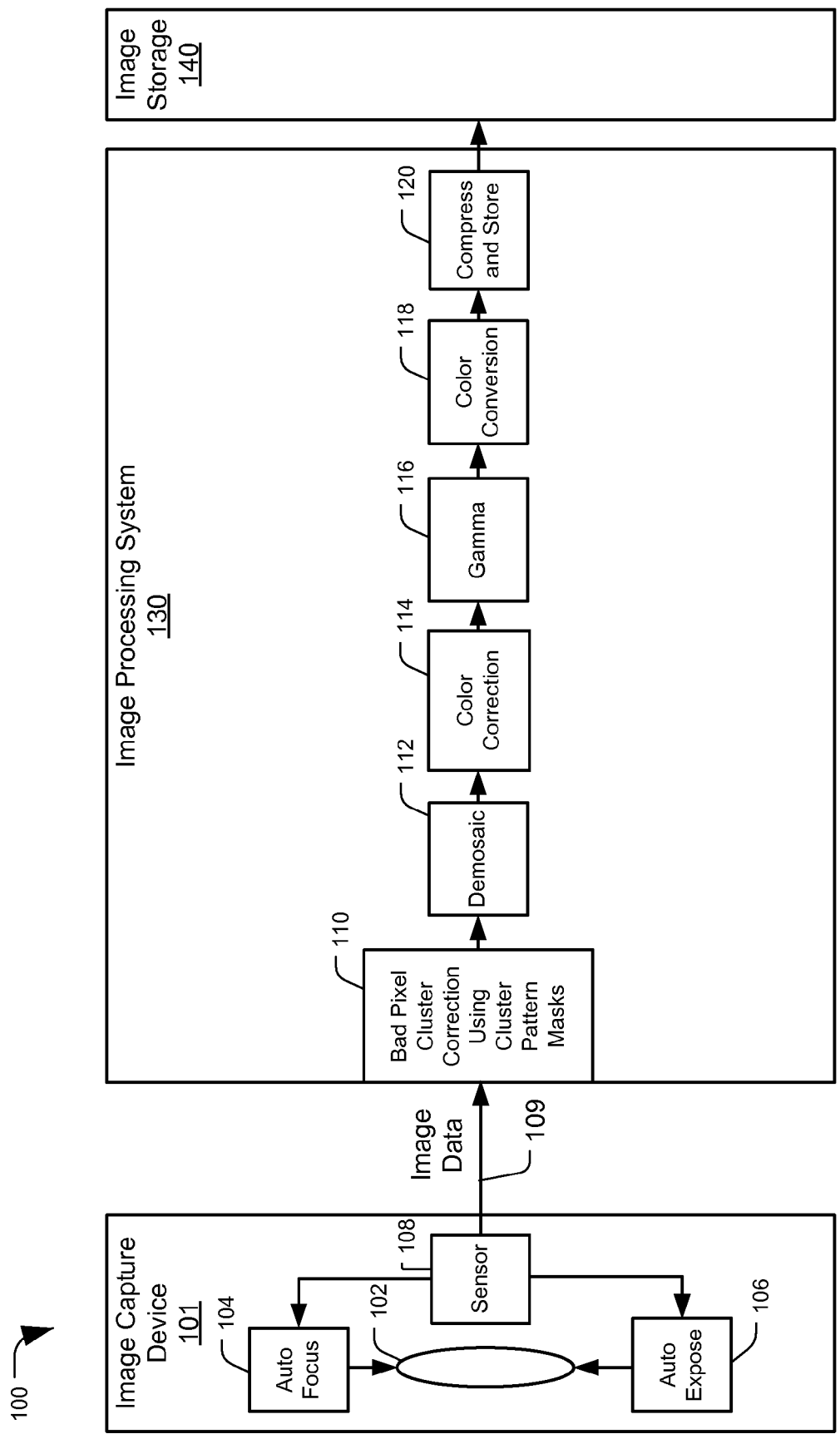
FIG. 1 is a block diagram of a particular illustrative embodiment of a system including an image processing system having a bad pixel cluster detection module.

FIG. 1 is a block diagram of a particular illustrative embodiment of a system including an image processing system having a bad pixel cluster detection and correction module. The system 100 includes an image capture device 101 coupled to an image processing system 130. The image processing system 130 is coupled to an image storage device 140. The image processing system 130 is configured to receive image data 109 from the image capture device 101 and to detect and correct bad pixel clusters of the image data 109 using cluster pattern masks. Generally, the system 100 may be implemented in a portable electronic device that is configured to perform real-time image processing using relatively limited processing resources.

In a particular embodiment, the image capture device 101 is a camera, such as a video camera or a still camera. The image capture device 101 includes a lens 102 that is responsive to a focusing module 104 and to an exposure module 106. A sensor 108 is coupled to receive light via the lens 102 and to generate the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to control an exposure of the image. In a particular embodiment, the sensor 108 includes multiple detectors, or pixel wells, that are arranged so that adjacent detectors detect different colors of light. For example, received light may be filtered so that each detector receives red, green, or blue incoming light.

The image capture device 101 is coupled to provide the image data 109 to the image processing system 130. The image processing system 130 includes a bad pixel cluster detection and correction module 110 that is configured to detect bad pixel clusters based on correlations to cluster pattern masks. The image processing system 130 also includes a demosaic module 112 to perform a demosaic operation on processed imaged data received from the bad pixel cluster detection and correction module 110. A color correction module 114 is configured to perform a color correction on demosaiced image data. A gamma module 116 is configured to generate gamma corrected data from data received from the color correction module 114. A color conversion module 118 is coupled to perform a color space conversion to the gamma corrected image data. A compress and store module 120 is coupled to receive an output of the color conversion module 118 and to store compressed output data to the image storage device 140. The image storage device 140 may include any type of storage medium, such as one or more display buffers, registers, caches, flash memory elements, hard disks, any other storage device, or any combination thereof During operation, the bad pixel cluster detection and correction module 110 may efficiently detect and correct bad pixel clusters of the input image data 109. For example, bad pixel clusters may be caused by increased or reduced pixel sensitivity, by current leakage into the pixel wells of the sensor 108, by dust particles between the lens 102 and the sensor 108, or other causes. As will be discussed in detail, detecting bad pixel clusters based on determining correlations of the input image data 109 to cluster pattern masks enables efficient image processing with accurate bad pixel cluster detection.

Figure 2:
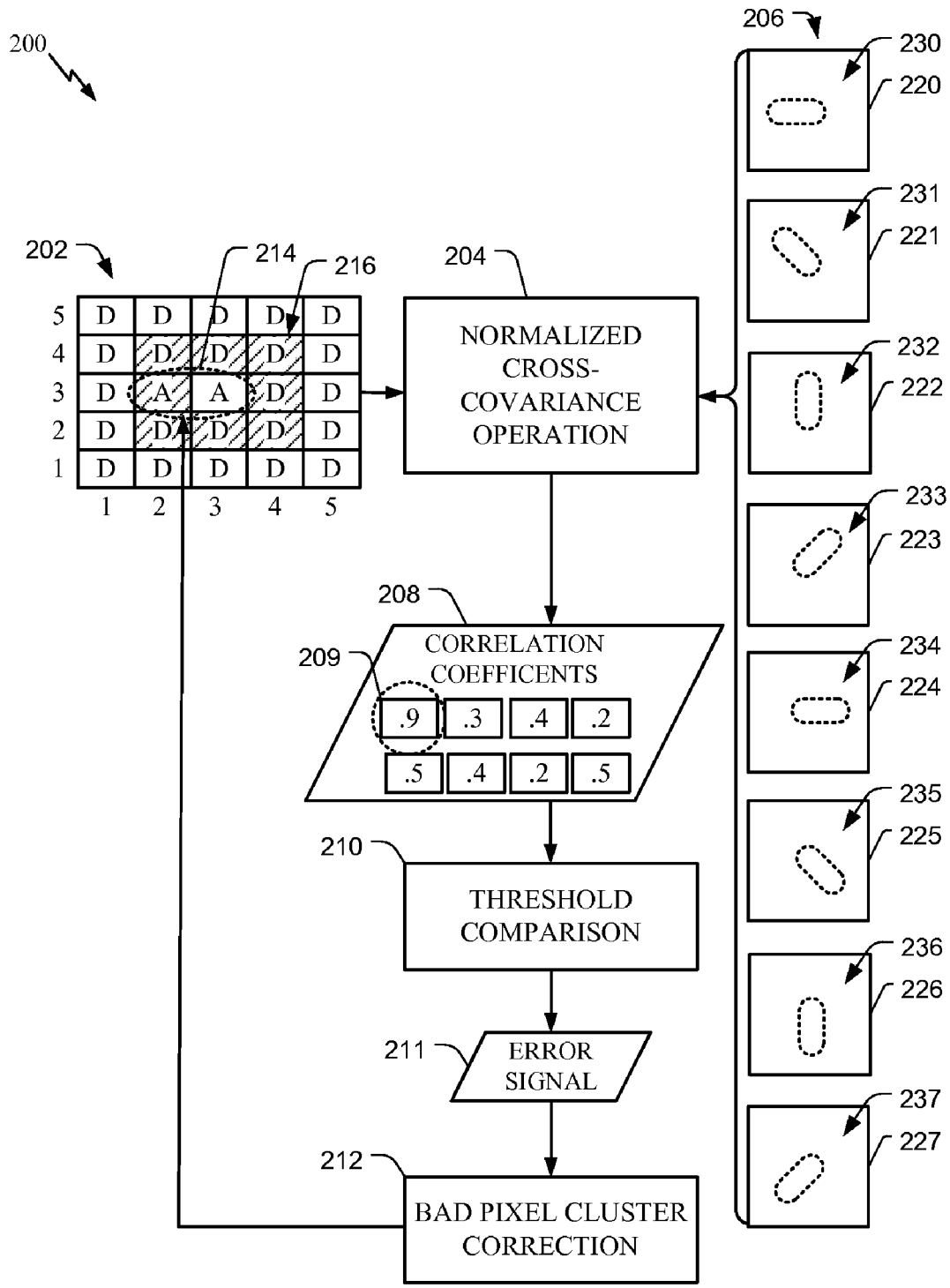
FIG. 2 is a data flow diagram of a first illustrative embodiment of a system to detect bad pixel clusters.

FIG. 2 is a data flow diagram of a first illustrative embodiment of a system to detect bad pixel clusters. Image data 202 and multiple pattern masks 206 are provided to a normalized cross-covariance operation module 204. Correlation coefficients 208 are generated by the normalized cross-covariance operation module 204 and provided to a threshold comparison module 210. An error signal 211 may be generated at the threshold comparison module 210 and provided to a bad pixel cluster correction module 212. In a particular embodiment, the system 200 may be implemented in the bad pixel cluster correction module 110 of FIG. 1.

The image data 202 is illustrated as including pixel data aligned in rows and columns having index values of 1-5. The image data 202 may represent a portion of a larger image that is being processed for bad pixel detection. A center pixel at (row, column) =(3,3) has eight nearest neighbors 216 illustrated as the eight shaded pixels adjacent to the center pixel vertically, horizontally, and diagonally. All pixels of the image data 202 are labeled "D" except for the center pixel and the pixel at (3,2), which are each labeled "A" and which form a cluster 214. In a first embodiment, the pixels labeled "A" each have a pixel value that is less than the minimum value of the pixels labeled "D," and the cluster 214 may be referred to as a cold cluster. In another embodiment, the pixels labeled "A" each have a pixel value that is greater than the maximum value of the pixels labeled "D," and the cluster 214 may be referred to as a hot cluster.

In a particular embodiment, the masks 206 include eight pattern masks 220-227, with each pattern mask 220-227 including data corresponding to a respective bad pixel cluster pattern 230-237, respectively. For example, the pattern mask 220 corresponds to a cluster pattern 230 including the center pixel and the pixel to the left of the center pixel as indicated by dashed lines. The pattern mask 221 corresponds to a cluster pattern 231 including the center pixel and the pixel adjacent to the center pixel at the adjacent upper-left diagonal. As depicted, the pattern masks 220-227 include data for the cluster patterns 230-237 that each include a center pixel and one of the eight nearest neighbor pixels to the center pixel.

In a particular embodiment, the normalized cross-covariance operation module 204 is configured to apply each of the pattern masks 220-227 to the image data 202. The normalized cross-covariance operation module 204 determines a "closeness" between the image data 202 and each expected bad pixel cluster constellation or pattern 230-237 of the pattern masks 220-227. The determined closeness is represented by correlation coefficients 208, where larger values of the correlation coefficient indicate stronger correlations and smaller values indicate weaker correlations.

Generally, the correlation coefficient ρ (or the normalized cross-covariance) between the image data 202 and a particular pattern 230-237 may be given as:

$$\rho = \frac{E[(S - m_s)(P - m_P)]}{\sigma_S \sigma_P} \quad [1]$$

where E[x] is the expectation value of x, S is the signal (the image data 202), $m_s$ is the mean value of the signal, P is the pattern (of a particular pattern mask 220-227), $m_p$ is the mean value of the pattern, $\sigma_s$ is the variance of the signal, and $\sigma_p$ is the variance of the pattern.

Equation [1] may be simplified by designing each pattern P to have a mean of "zero" and a constant variance that may be ignored for comparison purposes, resulting in a modified correlation coefficient $\rho_c$:

$$\rho_C = \frac{E[(S - m_S)P_m]}{\sigma_S} = \frac{E[S \cdot P_m] - m_S E[P_m]}{\sigma_S} \quad [2]$$
$$= \frac{E[S \cdot P_m]}{\sigma_S} \Rightarrow \frac{\left(\sum S \cdot P_m\right)^2}{\sum (S - m_s)^2}$$

where $P_m$ is a pattern having a zero mean.

The correlation coefficients 208 are used to detect bad clusters with very low probability of false detection. The correlation coefficients 208 may have several properties, such as independence of shifting and scaling between the pattern and the signal, normalization to a value between 0 and 1, and robustness to noise due to averaging. In addition, the same normalized cross-covariance operation may be performed to find both hot and cold clusters.

As illustrated, the normalized cross-covariance operation module 204 may determine the set of correlation coefficients 208 indicating a closeness between the image data 202 and each pattern mask 220-227. The largest correlation coefficient, illustrated as the first coefficient 209 that has a value of 0.9, is associated with the first pattern mask 220 having the first cluster pattern 230. Thus, the first cluster pattern 230 most closely corresponds to the image data 202.

In a particular embodiment, the threshold comparison module 210 is configured to compare the largest of the correlation coefficients 208, illustrated as the first correlation coefficient 209, to a threshold value. The threshold value may be predetermined or programmable. When the largest of the correlation coefficients exceeds the threshold, the threshold comparison module 210 may generate the error signal 211. The error signal 211 may signal to the bad pixel cluster correction module 212 that a bad pixel cluster has been detected. For example the error signal 211 may indicate that the center pixel of the image data 202 is associated with the bad pixel cluster 214, and that the bad pixel cluster 214 corresponds to the first pattern mask 230.

Upon receiving the error signal 211, the bad pixel cluster correction module 212 may be configured to adjust the values of the pixels of the bad pixel cluster 214. For example, the bad pixel cluster correction module 212 may set the value of each pixel of the bad pixel cluster 214 to the largest value of the remaining pixels in the five-by-five region for a hot cluster, or to the smallest value for a cold cluster. As other examples, largest or smallest values, or average values, of the remaining nearest neighbor pixels 216 may be used to replace the values of the bad pixel cluster 214.

During operation, the system 200 may perform a bad pixel cluster detection process on image data that is captured by an image sensor, retrieved from a memory, or received via a wireless or wireline transmission. The system 200 may traverse the image data pixel-by-pixel and, at each particular pixel, apply the pattern masks 206 to a portion of the image data centered at the particular pixel to detect bad pixel clusters based on the largest resulting correlation coefficient 209 exceeding a threshold value. The system 200 may perform a first pass to detect hot pixel clusters and a second pass to detect cold pixel clusters, or alternatively may perform the detection process for both hot clusters and cold clusters in a single pass through the image data. In addition, the system 200 may perform cluster detection after the image data has first been corrected for single bad pixel values (i.e, individual, non-clustered bad pixels).

In a particular embodiment, the normalized cross-covariance operation module 204, the threshold comparison module 210, the bad pixel cluster correction module 212, or any combination thereof, may be implemented as circuitry along an image data path, such as along a data path from an image sensor to correct the image data in transit to a display or to a memory. In another particular embodiment, the normalized cross-covariance operation module 204, the threshold comparison module 210, the bad pixel cluster correction module 212, or any combination thereof, may be implemented as executable instructions at one or more processors. For example, one or more of the modules 204, 210, and 212 may be implemented as executable instructions executed at a specialized processor, such as an image processor or a digital signal processor (DSP).

Although eight cluster patterns 230-237 are illustrated in the system 200, any number of cluster patterns may be used and may represent any configuration of cluster constellations, including constellations representing more than two pixels. In addition, various efficiencies and optimizations may be obtained, such as based on numerical simplifications, symmetries, and other inherent properties, without departing from the scope of the present disclosure. One particular example of a system exploiting such properties is depicted in FIG. 3.

Figure 3:
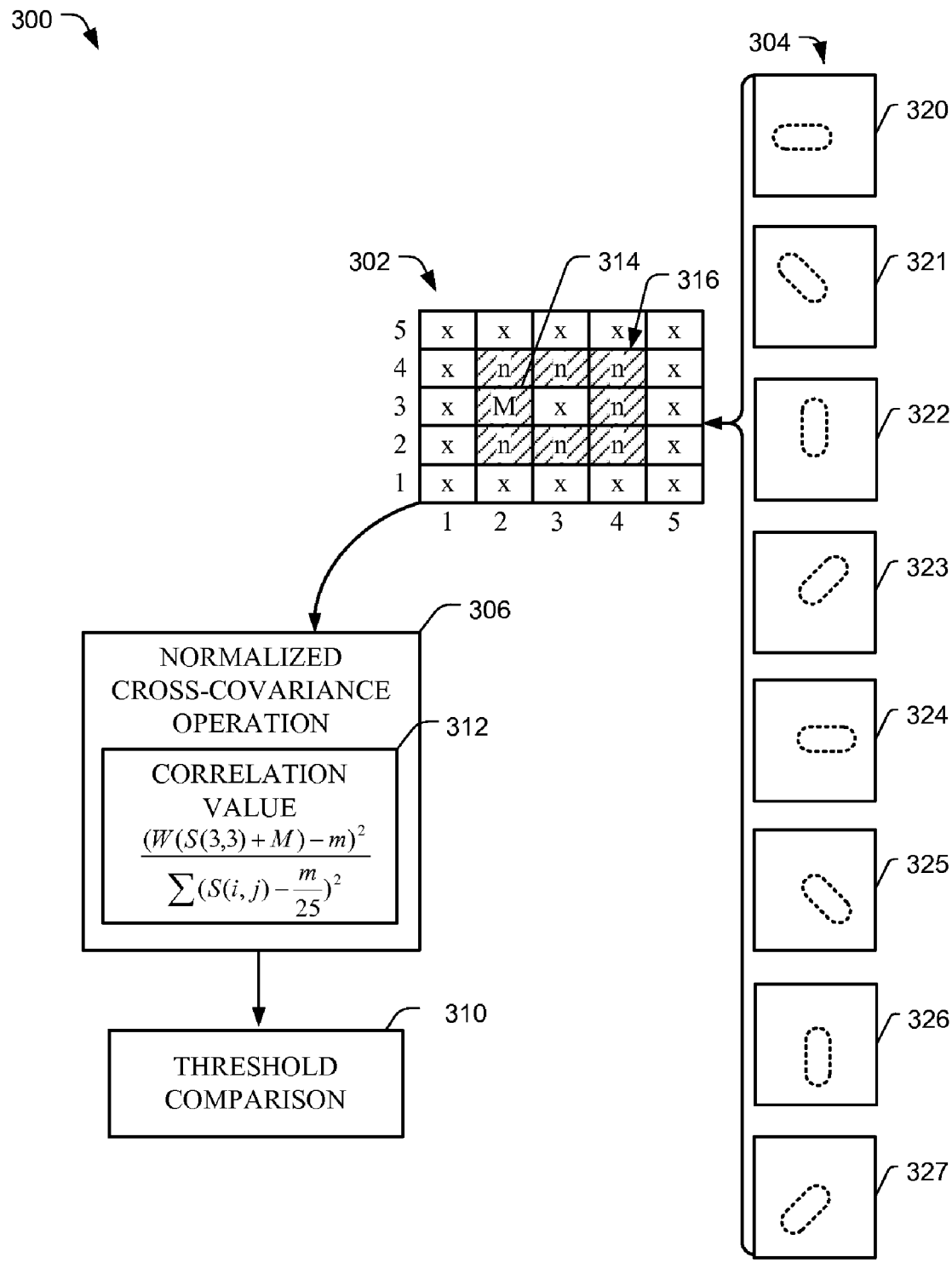
FIG. 3 is a data flow diagram of a second illustrative embodiment of a system to detect bad pixel clusters.

Referring to FIG. 3, a data flow diagram of a second illustrative embodiment of a system to detect bad pixel clusters is depicted and generally designated 300. In an illustrative embodiment, the system 300 may be implemented in the bad cluster correction module 110 of FIG. 1 and may depict a specific embodiment of the system 200 of FIG. 2. The system 300 includes a set of pattern masks 304 that are applied to image data 302 via a normalized cross-covariance operation 306. A threshold comparison 310 is performed on a result of the normalized cross-covariance operation 306. In a particular embodiment, bad pixel cluster detection is performed using a correlation value 312 that represents the normalized cross-covariance correlation coefficients of equation [1] or equation [2] simplified based on properties of system 300.

The set of pattern masks 304 includes eight masks 320-327, each mask 320-327 representing a bad pixel cluster pattern that includes the center pixel and one of the eight nearest neighbors of the center pixel in a five-by-five kernel. All pattern masks 320-327 have common elements including the center pixel and the sixteen outermost pixels, and differ only in the eight nearest neighbor pixels. When each pattern mask 320-327 is applied to the image data 302, the particular pattern mask 320-327 that most closely compares to the image data 302, i.e., that results in the largest correlation value, is the pattern mask 320-327 that represents a cluster that includes the nearest neighbor to the center pixel that has the largest value, for hot cluster detection, or the smallest nearest neighbor value for cold cluster detection.

The image data 302 includes a largest-valued nearest neighbor pixel 314 having a value ("M") that is the largest value of the eight nearest neighbors 316 to the center pixel. This largest-valued nearest neighbor pixel 314 will result in the largest correlation coefficient when the eight pattern masks 320-327 are applied to the image data 302. Therefore, computation and comparison of all eight correlation values corresponding to the eight masks 304 can be reduced to locating the largest value nearest neighbor pixel 314, illustrated as having a value "M," and determining a correlation value:

$$\rho = \frac{(W(S(3, 3) + M) - m)^2}{\sum \left(S(i, j) - \frac{m}{25}\right)^2} \quad [3]$$

where W is a weight applied to the cluster pixels via the pattern masks 320-327, S(i,j) is a value of a pixel at row i and column j of the image data 302, and m is the sum of the twenty-five pixels of the five-by-five square centered on (row, column)=(3,3) of the image data 302.

The resulting correlation value may be provided to the threshold comparison 310 to determine whether a hot pixel cluster is detected in the image data. The same process may be performed to determine whether a cold pixel cluster is detected in the image data by locating a smallest value "M" of the nearest neighbors 316 and determining the correlation value according to equation [3] using the smallest value "M."

Figure 4:
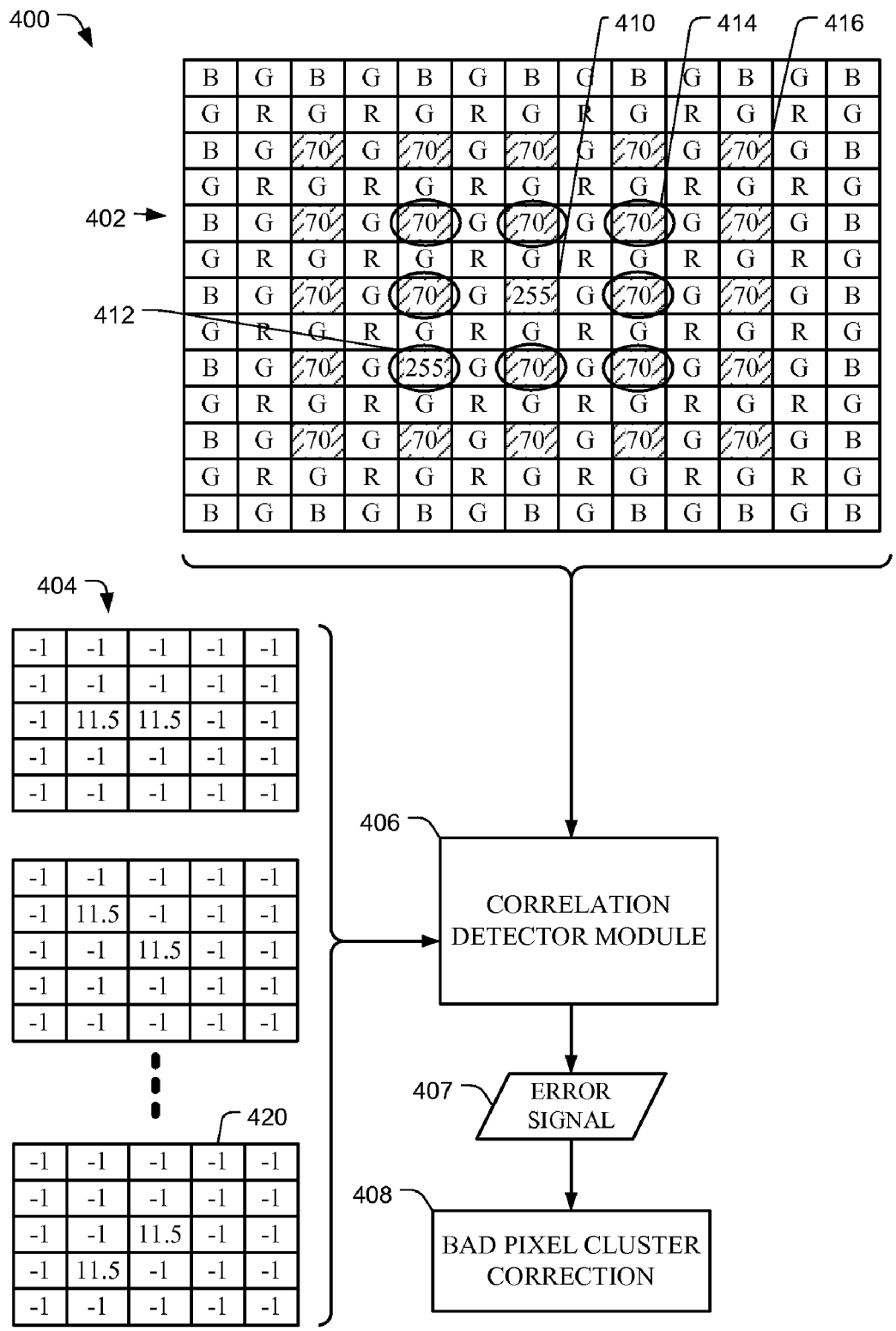
FIG. 4 is a data flow diagram of a third illustrative embodiment of a system to detect bad pixel clusters.

FIG. 4 is a data flow diagram of a third illustrative embodiment of a system to detect bad pixel clusters. In a particular embodiment, the system 400 may be implemented in the bad pixel cluster correction module 110 of FIG. 1 and may depict a specific embodiment of the system 200 of FIG. 2, the system 300 of FIG. 3, or any combination thereof The system 400 includes a correlation detector module 406 coupled to receive mosaic image data 402 and pattern masks 404 and configured to provide an error signal 407 to a bad pixel cluster correction module 408.

The mosaic image data 402 is illustrated as a regular array of pixels arranged in rows and columns of pixels corresponding to alternating colors. The columns alternate between columns having green (G) and blue (B) pixels, and columns having red (R) and green (G) pixels, in a common Bayer mosaic configuration. A center pixel 410 is illustrated as a blue pixel having a value of 255, representing a maximum value of an illustrative range from 0-255. The center pixel 410 is part of a bad pixel cluster that also includes a nearest neighbor blue pixel 412 that also has a value of 255, which is the largest value of the eight nearest neighbor pixels 414, illustrated as circled pixels. All pixels of a five-by-five square set of blue pixels 416 centered on the pixel 410, other than the bad pixels 410 and 412, are illustrated as shaded pixels and are depicted as having a value of seventy.

The pattern masks 404 correspond to bad pixel cluster patterns. Each pattern mask 404 has a first value of "11.5" associated with cluster pixels and a second value of "−1" associated with non-cluster pixels to be applied to the image data 402 for detecting bad pixel clusters. A particular pattern mask 420 has the "11.5" values for the center pixel and the lower-left nearest neighbor of the center pixel, and thus will generate the largest correlation coefficient in response to the bad pixel cluster of pixels 410 and 412 when applied to the image data 402.

The correlation detector module 406 is configured to apply the pattern masks 404 to the image data 402 on a color-by-color basis. For example, where the center pixel 410 is blue, the correlation detector module 406 is configured to apply the values of the pattern masks 404 to only the pixels that are in the five-by-five square set of blue pixels 416. Although the five-by-five square set of blue pixels 416 is located in a nine-by-nine pixel area of the image data 402, the correlation detector module 406 ignores the non-blue pixels within the nine-by-nine area when applying the pattern masks 404 to detect clusters based on the center blue pixel 410.

In a particular embodiment, the correlation detector module 406 is configured to determine a largest correlation result of the bad pixel cluster pattern masks 404 centered at the pixel 410, to normalize the largest correlation result, and to compare the normalized largest correlation result to a threshold. By applying the values of the pattern masks 404 to the image data 402, a weighted sum of intensity values corresponding to the cluster pixels 410 and 412 and an average value of the image data in the five-by-five blue pixel area 416, can be used to determine the correlation value. For example, in an embodiment where the correlation detector module 406 uses equation [3], the weighting value W is 12.5, the weighted sum of the cluster pixels 410 and 412 is given as 12.5*(255+255), and the average value of the image data in the five-by-five blue pixel area (m/25)=84.8.

Similar operations can be performed for the red pixels and the green pixels of the mosaic image data 402. In other embodiments, the mosaic image data 402 may include other colors or mosaic patterns, such as other three-color mosaic configurations, four-color mosaic configurations, or other mosaic configurations, and the correlation detector module 406 may be configured to apply the pattern masks 404 to pixels corresponding to individual color channels, such as described with respect to the blue color channel. In other embodiments, however, such as where the image data is not mosaic data, the system 400 may apply the pattern masks 404 directly to the received image data without adjusting for color channels. In addition, in other embodiments, the pattern masks 404 may not include the values "11.5" and "−1" and may instead include any desired values to detect bad pixel clusters.

Figure 5:
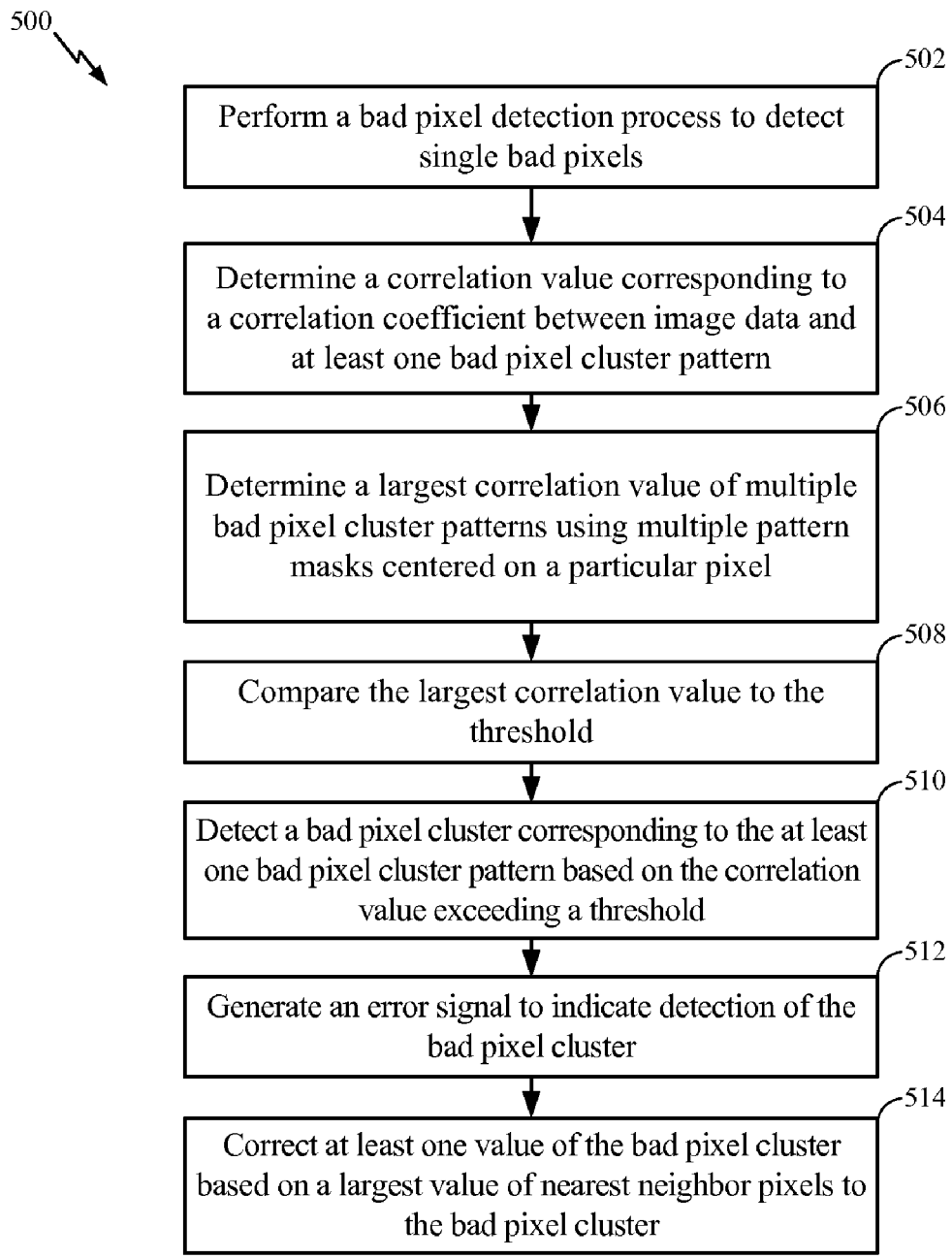
FIG. 5 is a flow chart of a particular illustrative embodiment of a method of detecting bad pixel clusters.

FIG. 5 is a flow chart of a particular illustrative embodiment of a method of detecting bad pixel clusters. In an illustrative embodiment, the method 500 may be performed by one or more of the systems depicted in FIGS. 1-4. At 502, in a particular embodiment, a bad pixel detection process is performed to detect single bad pixels. The single bad pixel detection may be performed to correct single bad pixels prior to performing a bad pixel cluster detection process.

Moving to 504, a correlation value is determined corresponding to a correlation coefficient between image data and at least one bad pixel cluster pattern. In a particular embodiment, determining the correlation value includes dividing a result of applying the bad pixel cluster pattern to the image data by a variance of the image data. Equations [1]-[3] provide non-limiting, illustrative examples of operations to determine suitable correlation values.

Proceeding to 506, in a particular embodiment, a largest correlation value of multiple bad pixel cluster patterns is determined using multiple pattern masks centered on a particular pixel. Each pattern mask includes data corresponding to a bad pixel cluster pattern. Each of the multiple pattern masks may include a first value associated with cluster pixels and a second value for non-cluster pixels. As an illustrative, non-limiting example, a first value of "11.5" and a second value of "−1" as illustrated in FIG. 4 may be used to simplify numerical operations to determine a correlation value associated with each pattern mask.

Each of the multiple pattern masks may correspond to a pixel cluster of two adjacent pixels. For example, the multiple pattern masks may include eight masks representing cluster patterns, with each of the eight masks corresponding to a cluster pattern that includes a center pixel and a respective one of eight neighbor pixels to the center pixel. In other embodiments, other pattern masks may be used in addition to or in place of some or all of the eight center pixel/nearest neighbor cluster masks.

In a particular example, the correlation value corresponds to a cross-covariance correlation coefficient. The correlation value may include a square of a sum of values of the image data within a five-pixel-by-five pixel area centered on the particular pixel multiplied by corresponding weights of a five-pixel-by-five-pixel pattern mask. The square of the sum of values may be divided by a variance of the values of the image data within the five-pixel-by-five pixel area centered on the particular pixel, such as discussed with respect to equations [1]-[3].

Advancing to 508, the largest correlation value may be compared to a threshold. Continuing to 510, a bad pixel cluster is detected corresponding to the at least one bad pixel cluster pattern based on the correlation value that exceeds the threshold. In a particular embodiment, the bad pixel cluster includes only pixels associated with a same color. For example, as discussed with respect to FIG. 4, the image data may include mosaic image data, and the bad pixel cluster patterns may be applied to pixels corresponding to a single color.

Moving to 512, an error signal may be generated to indicate detection of the bad pixel cluster. Proceeding to 514, in a particular embodiment, at least one value of the bad pixel cluster is corrected based on a largest value of nearest neighbor pixels to the bad pixel cluster.

Figure 6:
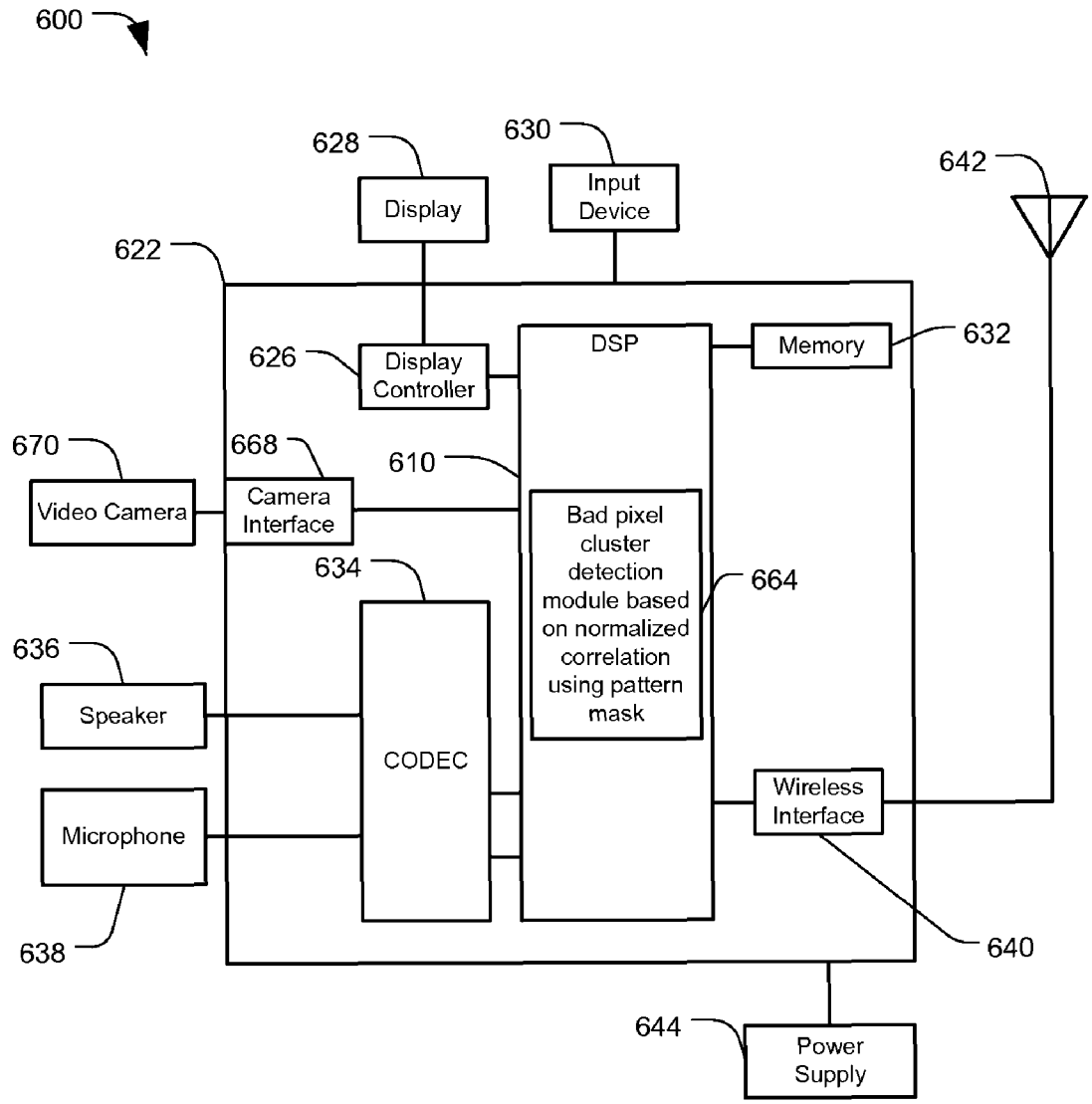
FIG. 6 is a block diagram of particular embodiment of a system including a bad pixel cluster detection module.

FIG. 6 is a block diagram of particular embodiment of a system including a bad pixel cluster detection module. The system 600 may be implemented in a portable electronic device and includes a signal processor 610, such as a digital signal processor (DSP), coupled to a memory 632. The system 600 includes a bad pixel cluster detection module based on normalized correlation using a pattern mask 664. In an illustrative example, the bad pixel cluster detection module based on normalized correlation using a pattern mask 664 includes any of the systems of FIGS. 1-4, operates in accordance with the method of FIG. 5, or any combination thereof. The bad pixel cluster detection module based on normalized correlation using a pattern mask 664 may be in the signal processor 610 or may be a separate device.

A camera interface 668 is coupled to the signal processor 610 and also coupled to a camera, such as a video camera 670. A display controller 626 is coupled to the signal processor 610 and to a display device 628. A coder/decoder (CODEC) 634 can also be coupled to the signal processor 610. A speaker 636 and a microphone 638 can be coupled to the CODEC 634. A wireless interface 640 can be coupled to the signal processor 610 and to a wireless antenna 642.

In a particular embodiment, the signal processor 610 includes the bad pixel cluster detection module 664 and is adapted to detect bad pixel clusters in image data based on a normalized correlation between the image data and a bad pixel cluster pattern mask. The signal processor 610 may also be adapted to generate processed image data having corrected pixel values corresponding to detected bad pixels. The image data having bad pixel clusters may include video data from the video camera 670, image data from a wireless transmission via the antenna 642, or from other sources such as an external device coupled via a universal serial bus (USB) interface (not shown), as illustrative, non-limiting examples.

The display controller 626 is configured to receive the processed image data and to provide the processed image data to the display device 628. In addition, the memory 632 may be configured to receive and to store the processed image data, and the wireless interface 640 may be configured to receive the processed image data for transmission via the antenna 642.

In a particular embodiment, the signal processor 610, the display controller 626, the memory 632, the CODEC 634, the wireless interface 640, and the camera interface 668 are included in a system-in-package or system-on-chip device 622. In a particular embodiment, an input device 630 and a power supply 644 are coupled to the system-on-chip device 622. Moreover, in a particular embodiment, as illustrated in FIG. 6, the display device 628, the input device 630, the speaker 636, the microphone 638, the wireless antenna 642, the video camera 670, and the power supply 644 are external to the system-on-chip device 622. However, each of the display device 628, the input device 630, the speaker 636, the microphone 638, the wireless antenna 642, the video camera 670, and the power supply 644 can be coupled to a component of the system-on-chip device 622, such as an interface or a controller.

Figure 7:
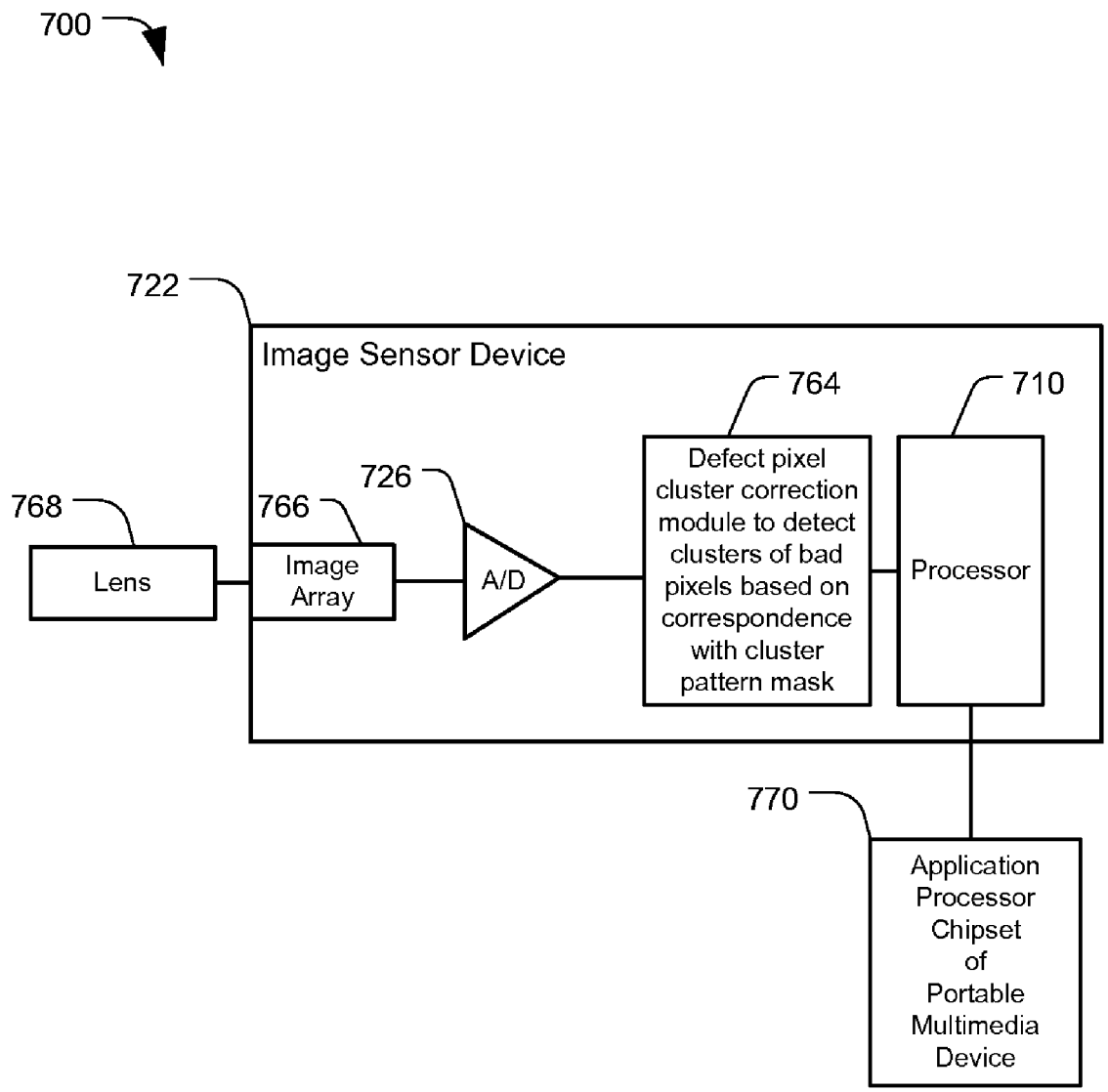
FIG. 7 is a block diagram of particular embodiment of a device including a defect pixel cluster detection module.

FIG. 7 is a block diagram of particular embodiment of a system including a defect pixel cluster detection module. The system 700 includes an image sensor device 722 that is coupled to a lens 768 and also coupled to an application processor chipset of a portable multimedia device 770. The image sensor device 722 includes a defect pixel cluster correction module 764 to detect clusters of bad pixels based on correspondence with a cluster pattern mask, such as by implementing one or more of the systems of FIGS. 2-4, by operating in accordance with the method of FIG. 5, or any combination thereof.

The defect pixel cluster correction module 764 is coupled to receive image data from an image array 766, such as via an analog-to-digital convertor 726 that is coupled to receive an output of the image array 766 and to provide the image data to the defect pixel cluster correction module 764.

The defect pixel cluster correction module 764 is adapted to detect a cluster of bad pixels of the image data based on a correspondence between pixel values of the image data and a cluster pattern mask, where the cluster pattern mask is associated with a center pixel and a nearest neighbor pixel to the center pixel. In a particular embodiment, the defect pixel cluster correction module is configured to determine when a particular pixel of the image data is part of the cluster of bad pixels by determining a largest value of nearest neighbor pixels to the particular pixel, applying a first weighting factor to the largest value of nearest neighbor pixels and a second weighting factor to other nearest neighbor pixels to generate a weighted result, scaling the weighted result by a variance of the image data within a region of the particular pixel to generate a normalized result, and comparing the normalized result to a threshold.

The image sensor device 722 may also include a processor 710. In a particular embodiment, the processor 710 is configured to implement the defect pixel cluster correction module 764. In another embodiment, the defect pixel cluster correction module 764 is implemented as image processing circuitry.

The processor 710 may also be configured to perform additional image processing operations, such as one or more of the operations performed by the modules 112-120 of FIG. 1. The processor 710 may provide processed image data to the application processor chipset 770 for further processing, transmission, storage, display, or any combination thereof.

Figure 8:
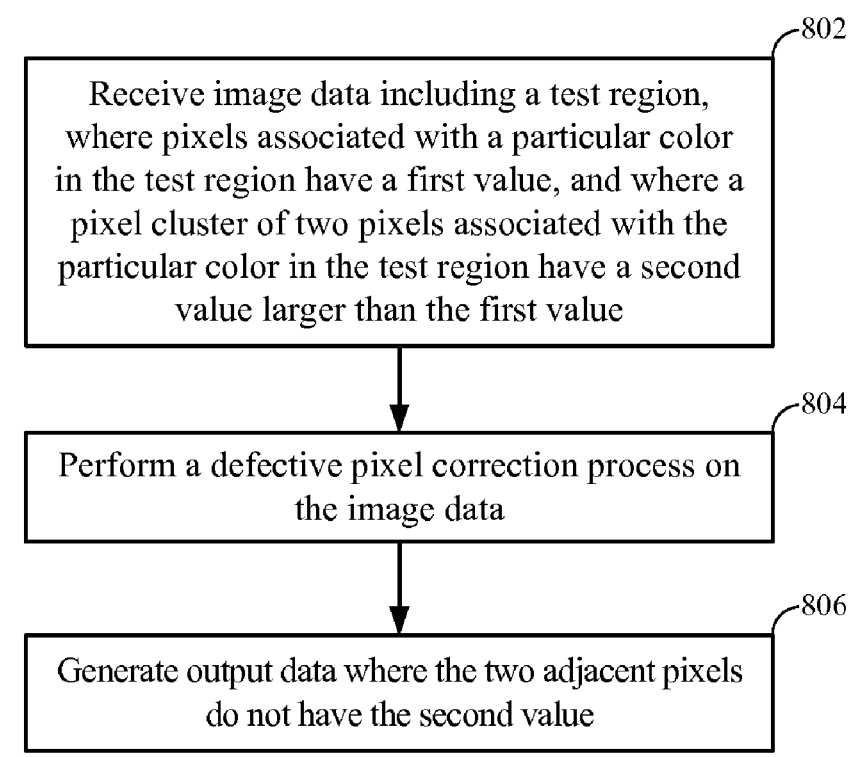
FIG. 8 is a flow chart of a particular illustrative embodiment of a method of processing image data including a test region having a bad pixel cluster.

FIG. 8 is a flow chart of a particular illustrative embodiment of a method of processing image data including a test region having a bad pixel cluster. The method 800 may be performed at one or more of the systems of FIGS. 1-4 or 6-7. At 802, image data including a test region is received. Pixels associated with a particular color in the test region have a first value, and a pixel cluster of two pixels associated with the particular color in the test region have a second value that is approximately five percent larger than the first value. For example, in image data where each pixel can have a value between 0 and 255, a test region may include the cluster of two nearest-neighbor blue pixels having a value of "105" while all other blue pixels in the test region have the value "100."

Moving to 804, a defective pixel correction process is performed on the image data. Continuing to 806, output data is generated where the two pixels of the pixel cluster do not have the second value. In the example where the cluster pixels have a value of "105" and the other test region pixels have a value of "100," the output data may include the cluster pixels having a value of "100," "101," "102," "103," or "104," as illustrative, non-limiting examples.

For example, the image data may be received at a defective pixel correction module of an image sensing device at a camera interface of an application processor chipset of a portable multimedia device, or at any other device configured to perform bad pixel cluster detection. A test region of the image data, which may include all of the image data or part of the image data, has pixels corresponding to a particular value. Two adjacent pixels of the test region are set to have a value approximately five percent greater than the particular value.

Generally, bad pixel correction in accordance with the disclosed embodiments of FIGS. 1-7, including using a cross-covariance correlation coefficient, will easily detect pixel clusters even slightly above or below a flat background as highly correlated with a corresponding cluster pattern and will correct the values of the bad pixels to a value closer to, or the same as, the flat background. However, other methods of detecting bad pixels, such as by comparisons to local minimum and maximum pixel values offset by a threshold, will not detect small variations from a flat background that are within the threshold, and therefore will not adjust the values of the bad pixels.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
providing data of at least one defective pixel cluster pattern;
providing image data corresponding to only a single frame of a captured image or a portion thereof;
determining a correlation value corresponding to a correlation coefficient between corresponding pixels of the image data and the at least one defective pixel cluster pattern; and
detecting defective pixels in a defective pixel cluster substantially simultaneously based on the correlation value exceeding a threshold.

2. The method of claim 1, further comprising correcting at least one value of the defective pixel cluster based on a largest value of nearest neighbor pixels to the defective pixel cluster.

3. The method of claim 1, further comprising generating an error signal to indicate detection of the defective pixel cluster.

4. The method of claim 1, wherein determining the correlation value includes dividing a result of applying the defective pixel cluster pattern to the image data by a variance of the image data.

5. The method of claim 1, further comprising:
determining a largest correlation value of multiple defective pixel cluster patterns using multiple pattern masks centered on a particular pixel, wherein each pattern mask includes data corresponding to a defective pixel cluster pattern; and
comparing the largest correlation value to the threshold.

6. The method of claim 5, wherein the multiple pattern masks include eight masks representing cluster patterns, and wherein each of the eight masks corresponds to a cluster pattern including a center pixel and a respective one of eight neighbor pixels to the center pixel.

7. The method of claim 5, wherein each of the multiple pattern masks corresponds to a pixel cluster mask of two adjacent pixels.

8. The method of claim 5, wherein each of the multiple pattern masks includes a first value associated with cluster pixels and a second value for non-cluster pixels.

9. The method of claim 5, wherein the correlation value corresponds to a cross-covariance correlation coefficient, and wherein the correlation value includes a square of a sum of values of the image data within a five-pixel-by-five pixel area centered on the particular pixel multiplied by corresponding weights of a five-pixel-by-five-pixel pattern mask, the square of the sum of values divided by a variance of the values of the image data within the five-pixel-by-five pixel area centered on the particular pixel.

10. The method of claim 1, wherein the defective pixel cluster includes only pixels associated with a same color.

11. The method of claim 1, further comprising performing a defective pixel detection process to detect single defective pixels before determining the correlation value.

12. A system comprising:
a defect pixel cluster correction module configured to receive image data corresponding to only a single frame of a captured image from an image array or a portion thereof and obtain data of a defective pixel cluster pattern as a cluster pattern mask, wherein the defect pixel cluster correction module is configured to detect defective pixels in a cluster of defective pixels of the image data substantially simultaneously based on a correspondence between pixel values of corresponding pixels of the image data and the cluster pattern mask, the cluster pattern mask associated with a center pixel and a nearest neighbor pixel to the center pixel.

13. The system of claim 12, where the defect pixel cluster correction module is adapted to determine when a particular pixel of the image data is part of the cluster of defective pixels by:
determining a largest value of nearest neighbor pixels to the particular pixel;
applying a first weighting factor to the largest value of nearest neighbor pixels and a second weighting factor to other nearest neighbor pixels to generate a weighted result;
scaling the weighted result by a variance of the image data within a region of the particular pixel to generate a normalized result; and
comparing the normalized result to a threshold.

14. The system of claim 12, wherein the defect pixel cluster correction module is within an image sensor device, the image sensor device further including an analog-to-digital converter coupled to receive an output of the image array and to provide the image data to the defect pixel cluster correction module.

15. The system of claim 12, further comprising a processor configured to implement the defect pixel cluster correction module.

16. The system of claim 12, wherein the defect pixel cluster correction module is implemented as image processing circuitry.

17. A system comprising:
a signal processor adapted to obtain image data corresponding to at least a portion of a captured image, obtain data of a defective pixel cluster as a pixel cluster pattern mask, and detect defective pixel clusters in the image data based on a normalized correlation between corresponding pixels of the image data and the defective pixel cluster pattern mask, the signal processor further adapted to generate processed image data having corrected pixel values corresponding to detected defective pixel clusters; and
a display controller coupled to receive the processed image data and to provide the processed image data to a display device.

18. The system of claim 17, wherein the signal processor is adapted to:
determine a largest correlation result of multiple defective pixel cluster pattern masks centered at a particular pixel of the image data;
normalize the largest correlation result; and
compare the normalized largest correlation result to a threshold.

19. The system of claim 17, wherein the signal processor is adapted to detect a defective pixel cluster including a particular pixel and a single adjacent pixel using a weighted sum of intensity values corresponding to the particular pixel and to the single adjacent pixel and also using an average value of the image data in a five-by-five pixel region centered on the particular pixel.

20. The system of claim 17, further comprising a camera interface coupled to the signal processor and configured to be coupled to a video camera, and wherein the image data includes video data received via the camera interface.

21. The system of claim 17, further comprising a wireless interface coupled to the signal processor and configured to be coupled to an antenna to enable wireless communication, and wherein the image data is received via the wireless interface.

22. A method comprising:
receiving image data including a test region, wherein pixels associated with a particular color in the test region have a first value, and where a pixel cluster of two pixels associated with the particular color in the test region have a second value that is approximately five percent larger than the first value;
performing a defective pixel correction process on the image data; and
generating output data where the two pixels of the pixel cluster do not have the second value.

23. The method of claim 22, wherein the image data is received at a defective pixel cluster correction module of an image sensing device.

24. The method of claim 22, wherein the image data is received at a camera interface of an application processor chipset of a portable multimedia device.

25. A method comprising:
determining a correlation value corresponding to a correlation coefficient between image data and at least one bad pixel cluster pattern; and
detecting a bad defective pixel cluster corresponding to the at least one bad pixel cluster pattern based on the correlation value exceeding a threshold, wherein determining the correlation value includes dividing a result of applying the bad pixel cluster pattern to the image data by a variance of the image data.

26. The method of claim 25, further comprising correcting at least one value of the bad pixel cluster based on a largest value of nearest neighbor pixels to the bad pixel cluster.

27. The method of claim 25, further comprising generating an error signal to indicate detection of the bad pixel cluster.

28. The method of claim 25, further comprising:
determining a largest correlation value of multiple bad pixel cluster patterns using multiple pattern masks centered on a particular pixel, wherein each pattern mask includes data corresponding to a bad pixel cluster pattern; and
comparing the largest correlation value to the threshold.

* * * * *